(12) United States Patent
Yao (10) Patent No.: US 8,776,824 B2
(45) Date of Patent: Jul. 15, 2014

(54) SANITARY AUTOMATIC WATER LEAKAGE DETECTION AND SHUT-OFF APPARATUS

(71) Applicant: Duan Yao, Chang Hua (TW)

(72) Inventor: Duan Yao, Chang Hua (TW)

(73) Assignee: Micro Sutures & Golden-Tech Co., Ltd., Homei, Chang Hua (TW)

( * ) Notice: Subject to any disclaimer, the term of this patent is extended or adjusted under 35 U.S.C. 154(b) by 0 days.

(21) Appl. No.: 13/656,633

(22) Filed: Oct. 19, 2012

(65) Prior Publication Data

US 2014/0109994 A1   Apr. 24, 2014

(51) Int. Cl.
*F16K 31/02* (2006.01)
*F16K 37/00* (2006.01)

(52) U.S. Cl.
USPC ........... 137/312; 137/551; 340/604; 340/605; 251/129.04

(58) Field of Classification Search
CPC ...................................................... F16K 37/00
USPC ........................... 137/312, 551; 340/605, 604; 251/129.04
See application file for complete search history.

(56) References Cited

U.S. PATENT DOCUMENTS

| | | | |
|---|---|---|---|
| 5,190,069 A * | 3/1993 | Richards | 137/312 |
| 6,057,770 A * | 5/2000 | Justesen | 340/605 |
| 6,230,735 B1 * | 5/2001 | Bravo | 137/312 |
| 6,523,562 B2 * | 2/2003 | Harper | 137/312 |
| 6,950,032 B1 * | 9/2005 | Hewitt et al. | 340/686.1 |
| 7,082,959 B1 * | 8/2006 | Franklin | 137/312 |
| 7,549,435 B2 * | 6/2009 | Walter | 137/15.11 |
| 7,574,878 B2 * | 8/2009 | Schroeder | 68/12.19 |
| 7,926,504 B2 * | 4/2011 | Sharp | 137/15.11 |
| 8,430,115 B2 * | 4/2013 | Stieb | 137/312 |

* cited by examiner

*Primary Examiner* — Kevin Lee (57) ABSTRACT

The present invention provides a sanitary automatic water leakage detection and shut-off apparatus installed between a water controlling unit and a water outgoing unit and comprising a water controller, an accumulating unit and a detecting unit; wherein the water controlling unit comprises an inlet, an outlet and a solenoid valve. The solenoid valve is a normally-open solenoid valve capable of closing the outlet to stop water from going out. The accumulating unit is mounted between the water controlling unit and the water outgoing unit and comprises an accumulating hole adjacent to a bottom thereof. The detecting unit is installed on the accumulating unit and electrically connected to the solenoid valve. The detecting unit activates the solenoid valve via an electronic communication method based on a leakage status of the accumulating unit to shut off the water outlet of the water controlling unit and to stop water supply thereof immediately.

10 Claims, 8 Drawing Sheets

SANITARY AUTOMATIC WATER LEAKAGE DETECTION AND SHUT-OFF APPARATUS

The present invention is related to a sanitary water leakage detection system, in particular, to a sanitary automatic water leakage detection and shut-off apparatus which is capable of shutting off water supply during a water leakage thereof.

DESCRIPTION OF RELATED ART

Water leakages of sanitary assembly often occur at the connection points of the pipelines or at the damaged gaps of configurations of curve pipelines. When the amount of the water leakage is small, it is often difficult to be spotted by the user. Therefore, currently, there is a known type of nigh-time water leakage detection apparatus capable of utilizing a warning alarm to create warning sounds so as to notify the user about the water leakage occurring of the sanitary accessories.

Although the existing water leakage apparatus utilizes the warning sounds to notify such event and is equipped with a certain detection function, it is unable to immediately notify users about the water leakage in the event that the user is away from home or out for work during day-time. It is likely that by the time when the user is aware of the water leakage after returning home, the water is already accumulated to certain level on the floor, creating a mess to the entire room. In addition, the accumulated water on the floor causes floor carpet wet and dirty as well as damages the interior decoration or furniture. In other words, such a conventional water leakage detection system with warning sounds is not of practical usages and there is a need for an improvement.

SUMMARY OF THE INVENTION

The present invention provides a sanitary automatic water leakage detection and shut-off apparatus which is capable of closing the water outlet upon detection of water leakage such that the effect of immediate shut-off of water leakage can be achieved.

The sanitary automatic water leakage detection and shut-off apparatus of the present invention is able to complete enclose the leakage of water in the water accumulating unit such that the water does not flow or leak out to keep the floor dry and clean without causing wetness to the interior decoration or furniture.

Accordingly, a sanitary automatic water leakage detection and shut-off apparatus installed between a water controlling unit and a water outgoing unit and having a connecting unit between the water controlling unit and the water outgoing unit is provided; the water shut-off apparatus comprises the water controller unit, a water accumulating unit and a detecting unit. The water controlling unit comprises a water inlet, a water outlet and a solenoid valve between the water outlet and the water inlet; wherein the solenoid valve is a normally-open-type solenoid valve and is capable of closing the water outlet to stop water from going out. The water accumulating unit is provided between the water controlling unit and the water outgoing unit to completely enclose the connecting unit and comprises a water accumulating hole adjacent to a bottom thereof. The detecting unit is installed on the water accumulating hole of the water accumulating unit and electrically connected to the solenoid valve; wherein the detecting unit activates the solenoid valve in an electronic communication manner based on a leakage status of the water accumulating unit so as to shut off the water outlet of the water controlling unit and to stop water supply thereof.

Other objectives, advantages and features of the present invention will be apparent from the following description referring to the attached drawings.

BRIEF DESCRIPTION OF THE DRAWINGS

The present invention will be described via detailed illustration of two embodiments referring to the drawings wherein.

DESCRIPTION OF EMBODIMENTS OF THE INVENTION

Figure 1:
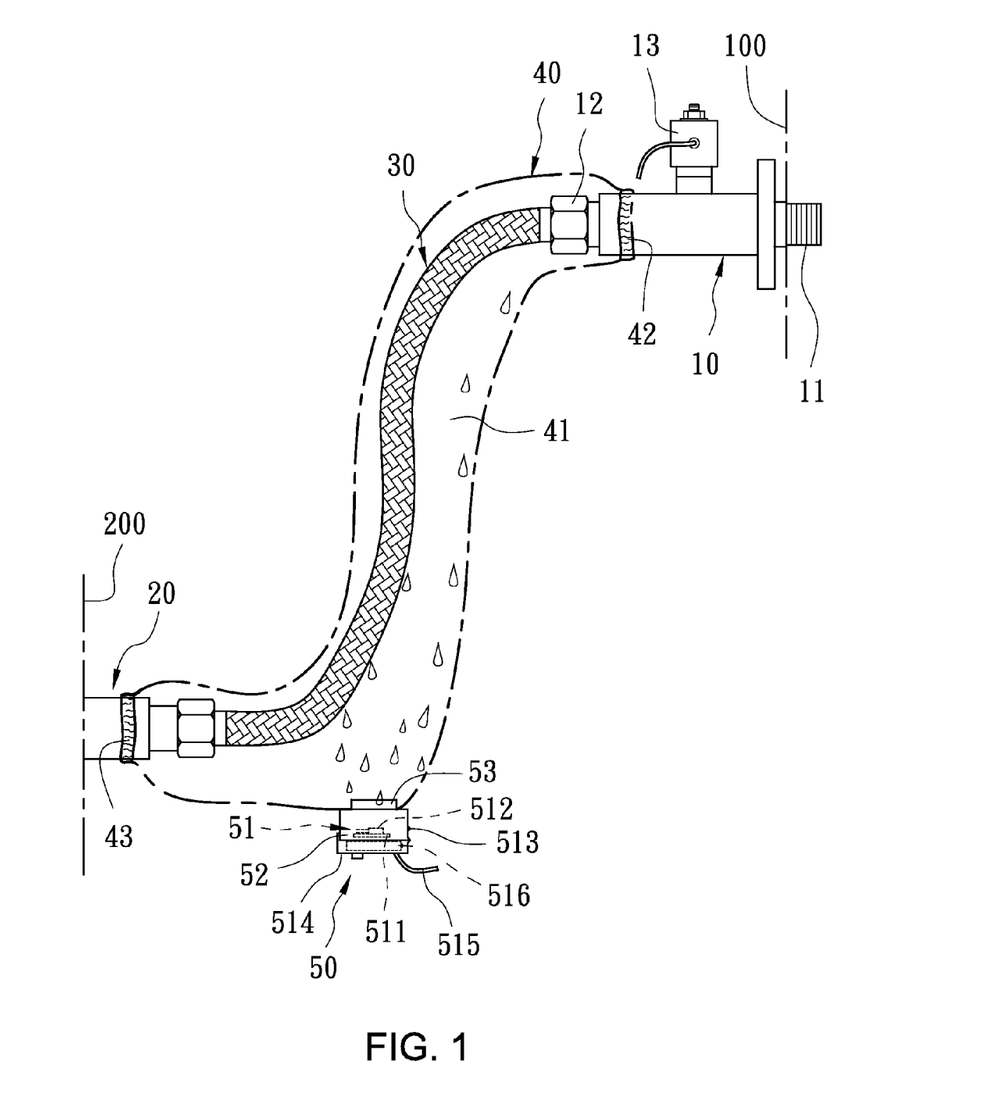
FIG. 1 is an assembly view of the sanitary automatic water leakage detection and shut-off apparatus according to a first embodiment of the present invention.

As shown in FIG. 1, a sanitary automatic water leakage detection and shut-off apparatus according to a first embodiment of the present invention is installed between a water controlling unit 10 and a water outgoing unit 20 and have a connecting unit 30 between the water controlling unit 10 and the water outgoing unit 20. The water shut-off apparatus comprises the water controlling unit 10, a water accumulating unit 40 and a detecting unit 50.

The water controlling unit 10 includes a water inlet 11, a water outlet 12 and a solenoid valve 13 between the water outlet 11 and the water inlet 12. The solenoid valve 13 is a normally-open-type solenoid valve and is capable of closing the water outlet 12 so as to stop water from going out.

The connecting unit 30, in this embodiment, is a pipe with a suitable elasticity.

The water accumulating unit 40 is provided between the water controlling unit 10 and the water outgoing unit 20 and completely encloses the connecting unit 30. In this embodiment, the water accumulating unit 40 is a hollow plastic bag having two opening ends a hollow room 41, two elastic restraining opening 42, 43 on two ends thereof and a water accumulating hole 44. The water accumulating hole 44 is arranged in accordance with the configuration of the bag enclosing the connecting unit 30 and is adequately arranged adjacent to a bottom (the lowest horizontal position) of the water accumulating unit 40 such that the leaked from the connecting unit 30 flows automatically toward the water accumulating hole 44.

Figure 2:
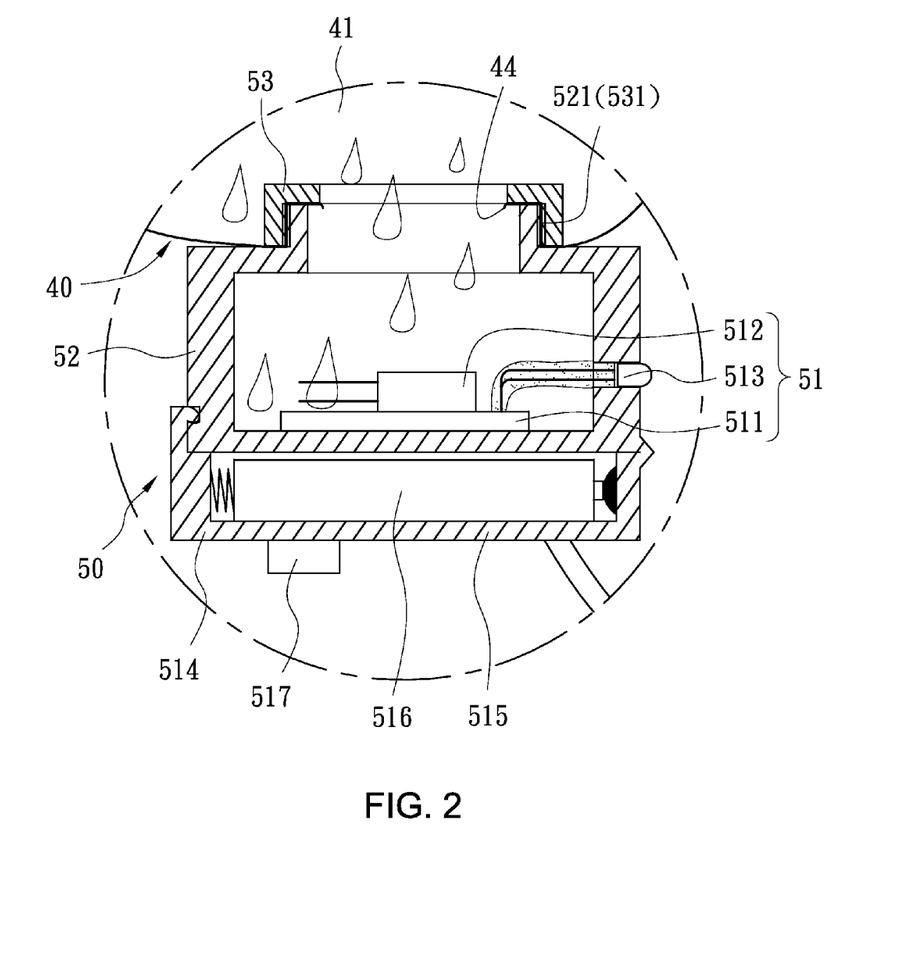
FIG. 2 is a cross sectional view of the assembly of the detecting unit and the water accumulating unit according to the first embodiment of the present invention.

Referring to FIG. 2, the detecting unit 50 is installed on the water accumulating hole 44 of the water accumulating unit 40 and is electrically connected to the solenoid valve 13 of the water controlling unit 10 (in this embodiment, a wired connection is illustrated) such that the water leakage flows from the water accumulating hole 44 into the detecting unit 50. Accordingly, the detecting unit 50 is able to activate the solenoid valve 13 in an electronic communication manner based on a leakage status of the water accumulating unit 40 so as to shut off the water outlet 12 of the water controlling unit 10 and to stop water supply thereof.

The detecting unit 50 includes a detection circuit 51, a container 52 and a hollow securement ring 53. A top of the container 52 includes an external thread 521, and the securement ring 53 includes an internal thread 531 correspondingly fastened onto the external thread 521. The detection circuit 51 includes a circuit board 511, a moisture sensor 512, and an LED 513 exposing to an external of the container 52 as well as a battery box 514 for supplying necessary power thereto. The detection circuit 51 is electrically connected to the solenoid valve 13 via a wire 515 extending outward therefrom. In addition, in order to prevent the water leakage from damaging the electronic circuitry and functions thereof, the circuit board 511 and the LED 513 of the detecting circuit 51 can be coated with a water-proof insulating gel so as to achieve the water-proof effect. Furthermore, in this embodiment, the detecting unit 50 further includes an alarming device 517 for indicating a power status thereof such that during a weak power of the battery 516, the alarming device 517 is able to provide a notification of insufficient power, for example, a flickering light.

During the practical usage of the present invention, the water supply unit 10 is attached to a water supply end 100 (shown by the water hole exposed on the wall in the figure). The water outgoing unit 20 is connected to a water usage end 200 (shown by the water inlet pipe of the toilet tank in the figure). As for the assembly thereof, the detecting unit 50 is mounted on the water accumulating hole 44 of the water accumulating unit 40 first, which is followed by mounting the water accumulating unit 40 on the outer side of the connecting unit 30. Then, two ends of the connecting unit 30 are secured on the water controlling unit 10 and the water outgoing unit 20 respectively. Furthermore, the two ends of the water accumulating unit 40 and the elastic restraining openings 42, 43 are mounted on the water outlet 12 of the water controlling unit 10 and the water outgoing unit 20 respectively such that the detecting unit 50 is positioned adjacent to the bottom of the water accumulating unit 40.

Figure 3:
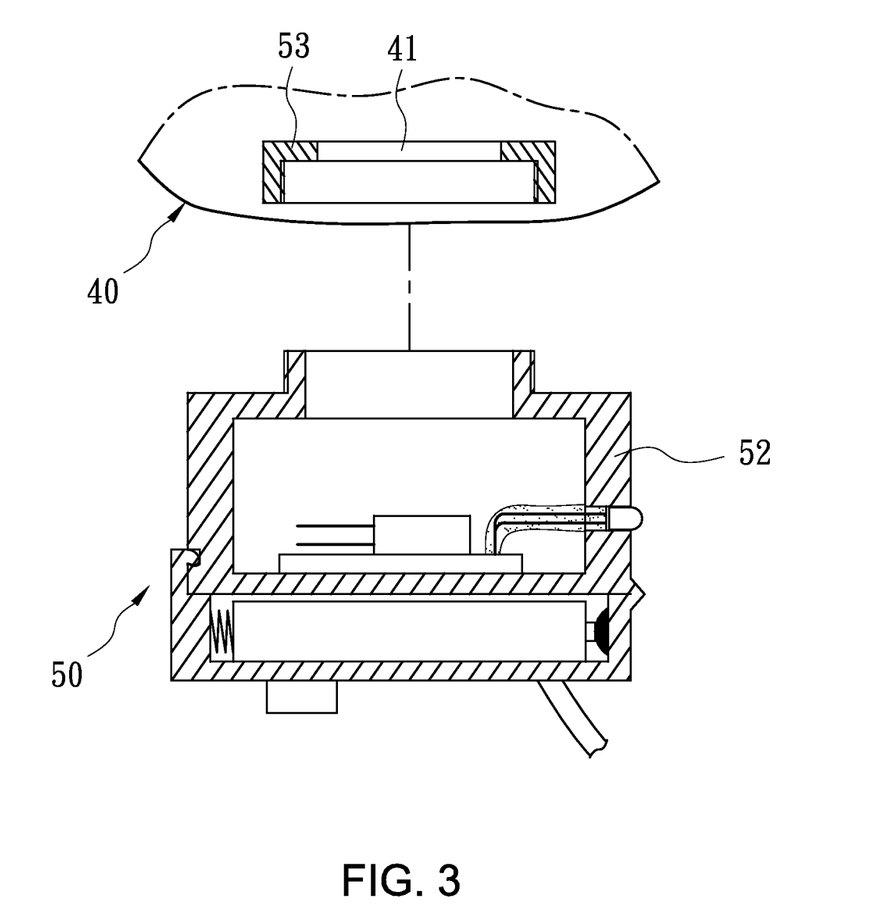
FIG. 3 is an exploded view of the securement ring, the water accumulating unit and the container according to the first embodiment of the present invention.
Figure 4:
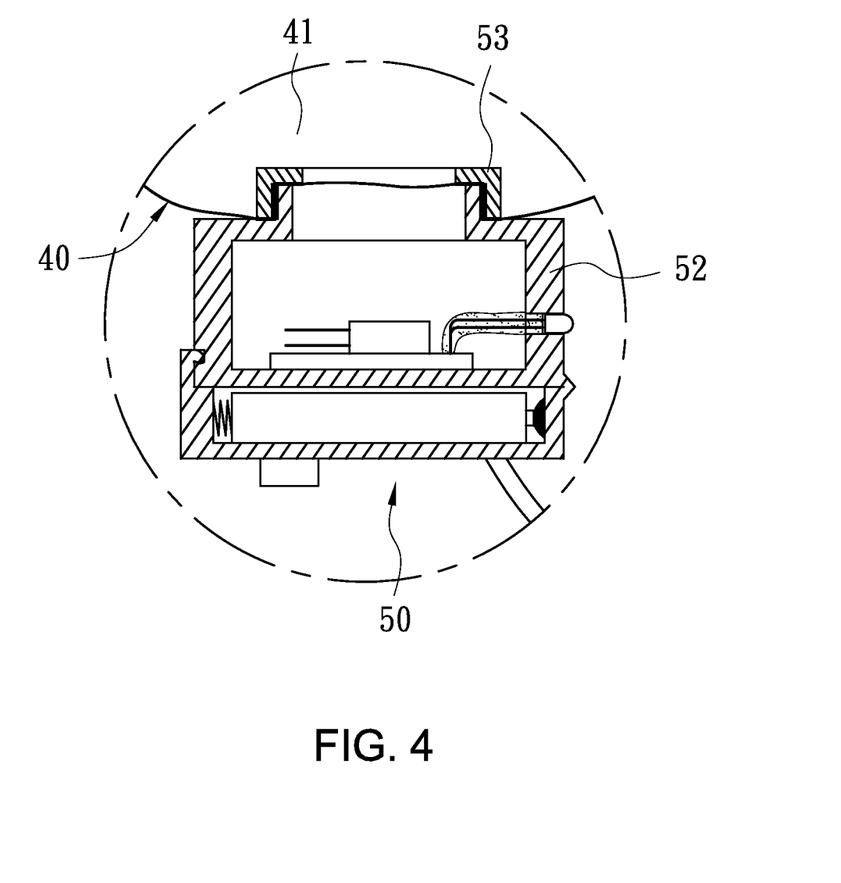
FIG. 4 is cross sectional view of the assembly of the securement ring and the container relatively clamped and secured onto the water accumulating unit according to the first embodiment of the present invention.

It is noted that in order to arrange the detecting unit 50 at a lower position on the bottom of the water accumulating unit 40, one can utilize the specific feature of the water accumulating unit 40 as a re-sizable bag and, as shown in FIG. 3, the securement ring 53 penetrates the internal of the hollow room 41 of the water accumulating unit 40 and while the container 52 is provided at the external of the water accumulating unit 40. Then, as shown in FIG. 4, the securement ring 53 and a container 52 are correspondingly attached and clamped adjacent to the bottom of the water accumulating unit 40. As the securement ring 53 and the container 52 are firmly secured, the bag material of the water accumulating unit 40 can then be clamped between the two. Following which, a cutting tool such as knife can then be inserted into the securement ring 53 and along the inner hole edge of the securement ring 53 to cut out a hole on the water accumulating unit 40 in order to form the water accumulating hole 44, as shown in FIG. 2. Such that the hollow room 41 and the internal of the container 52 are fluidly connected. Furthermore, other than the wired manner of connecting the detecting unit 50 with the solenoid valve 13, a wireless communication can be used to electrically connect to the solenoid valve 13 so as to transmit a leakage signal to the water controlling unit 10 such that the water outlet 12 is shut off to stop water supply, which shall too be considered as an embodiment with equivalent modifications.

During its operation, the internal battery 516 of the battery box 514 provides water to the detecting unit 50. Once activated, if there is water leakage due to the lost of sealing effect at the pipe connection points or due to the broken water pipe walls of the connecting unit 30, the water automatically flows downward and toward the lower area of the water accumulating unit 40 and into the container 52 of the detecting unit 50. When the moisture detected by the moisture sensor 512 reaches a certain level, the detecting circuit 51 is able to immediately activate the normally-open-type solenoid 13 such that it is immediately switched to be at a close state so as to shut off the water outlet 12 of the water controlling unit 10 to stop water from going out and to achieve the effect of automatic leakage prevention. During this time, the LED 513 emits light to indicate the user about the occurrence of water leakage so as to achieve the effect of warning.

Figure 5:
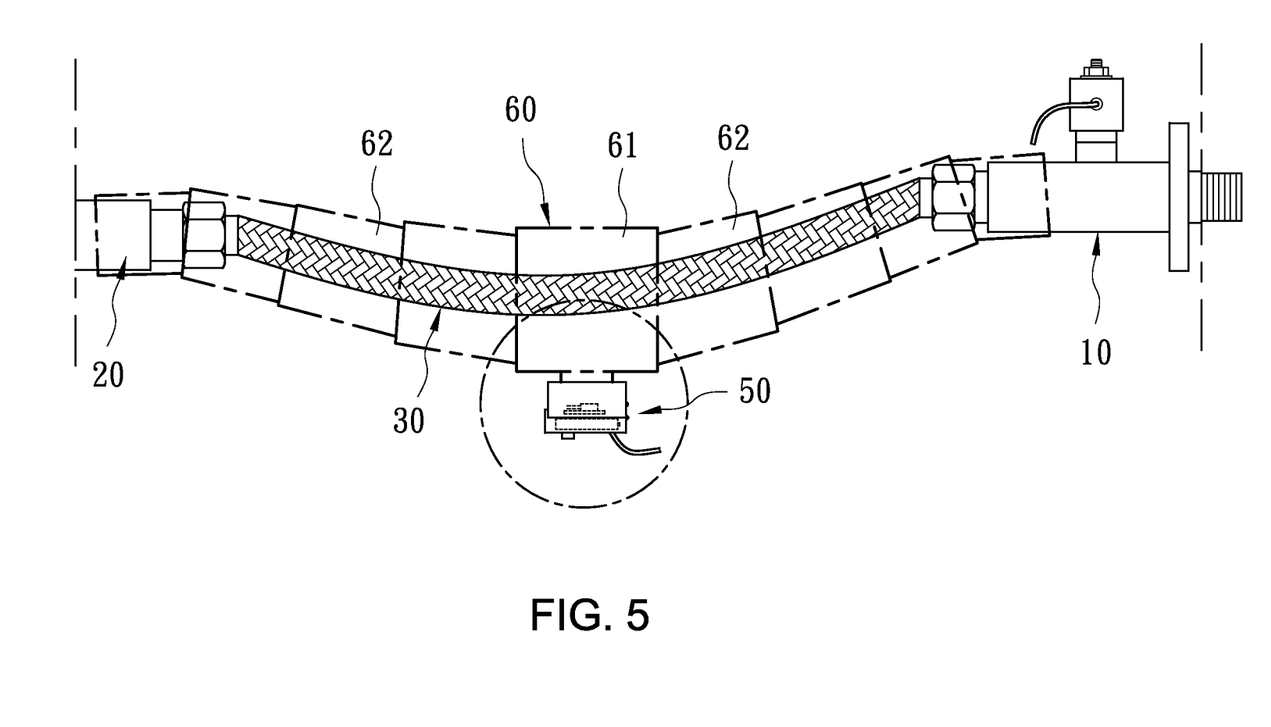
FIG. 5 is an assembly view the sanitary automatic water leakage detection and shut-off apparatus according to a second embodiment of the present invention.
Figure 6:
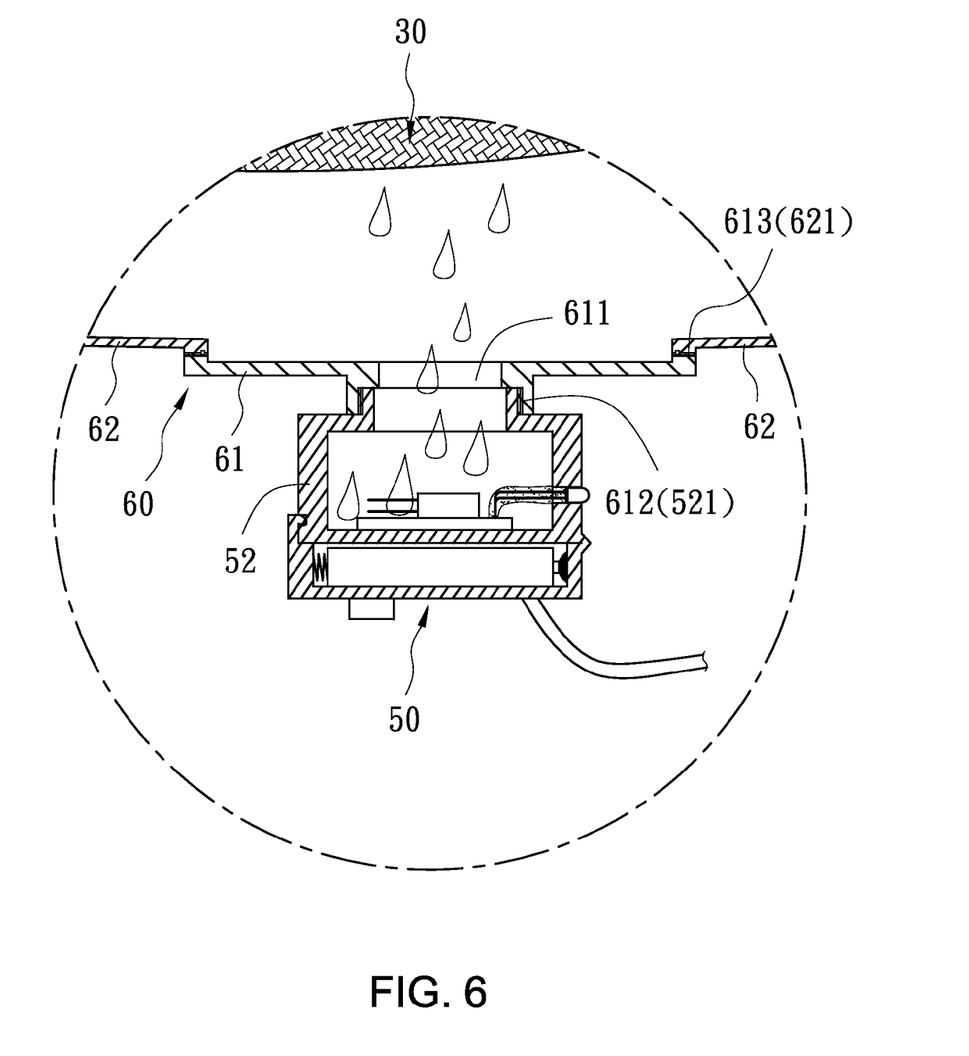
FIG. 6 is a partially enlarged view of the circled area in FIG. 5, showing the cross sectional view of the assembly of the detecting unit and the water accumulating unit according to the second embodiment of the present invention.

FIGS. 5 and 6 show a sanitary automatic water leakage detection and shut-off apparatus according to a second embodiment of the present invention, which is similarly installed between the water controlling unit 10 and the water outgoing unit 20 and includes a water controlling unit 10, a water accumulating unit 60 and a detecting unit 50.

Since the detail structures of the water controlling unit 10 and the detecting unit 50 are identical to the ones of the abovementioned first embodiment, the descriptions thereof are therefore omitted. In the second embodiment, the securement ring 53 of the detecting unit 50, shown in FIG. 2, can be omitted without use.

The water accumulating unit 60, on the other hand, is formed of a plurality of elastic hollow sectioned pipes 61, 62 attached to each other; and wherein a hollow sectioned pipe 61 with the largest diameter includes a water accumulating hole 611. The accumulating hole 611 includes an inner thread 612 provided to be fasten with an outer thread 521 of the container 52 such that the detecting unit 50 is attached to the water accumulating unit 40.

Figure 8:
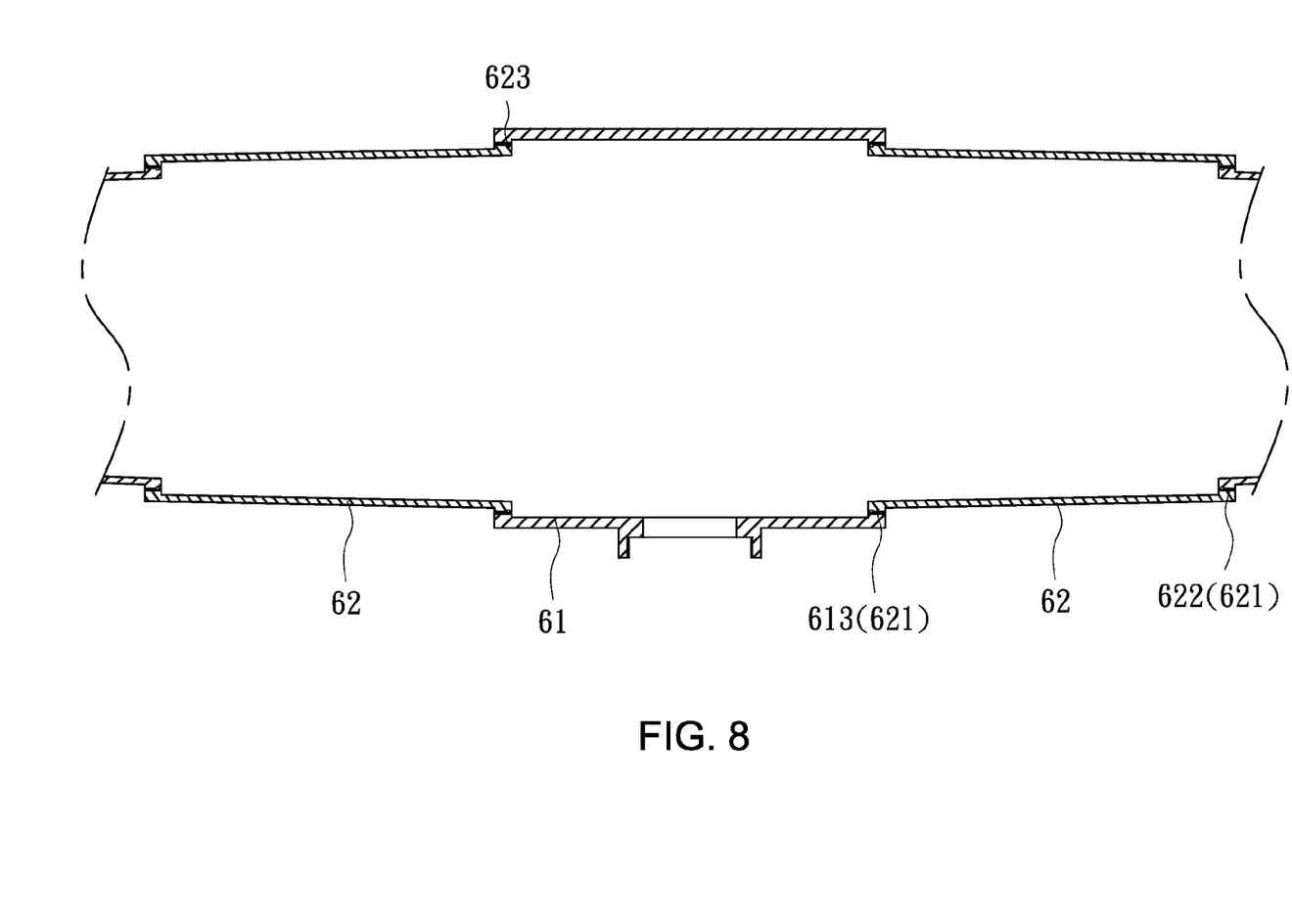
FIG. 8 is a partial cross sectional view of the water accumulating unit in a pull-out and extended state thereof according to the second embodiment of the present invention.

Furthermore, the abovementioned hollow sectioned pipe 62 is of a slanted shape toward the external diameter and two ends of the hollow sectioned pipes 61, 62 includes threaded sections 613, 621, 622 respectively. The hollow sectioned pipes 61, 62 being pulled out and extended outward, as shown in FIG. 8, are able to utilize the threaded sections 613, 621, 622 to be screwed and fastened with each other so as to achieve the effect of extension positioning. In addition, a water-proof ring 623 provided on the threaded sections 613, 621, 622 can be used for preventing the water inside the water accumulating 60 from leaking out at the fastening portions of the hollow sectioned pipes 61, 62.

In the second embodiment, the operation in which the connecting unit 30 is of a U-shape facing downward and is installed between the water controlling unit 10 and the water outgoing unit 20 is disclosed. It is particularly suited to sectioned pipes of the water accumulating unit 60. Since the operation and effects of the second embodiment are identical to the ones of the abovementioned first embodiment, detail descriptions thereof are therefore omitted.

Figure 7:
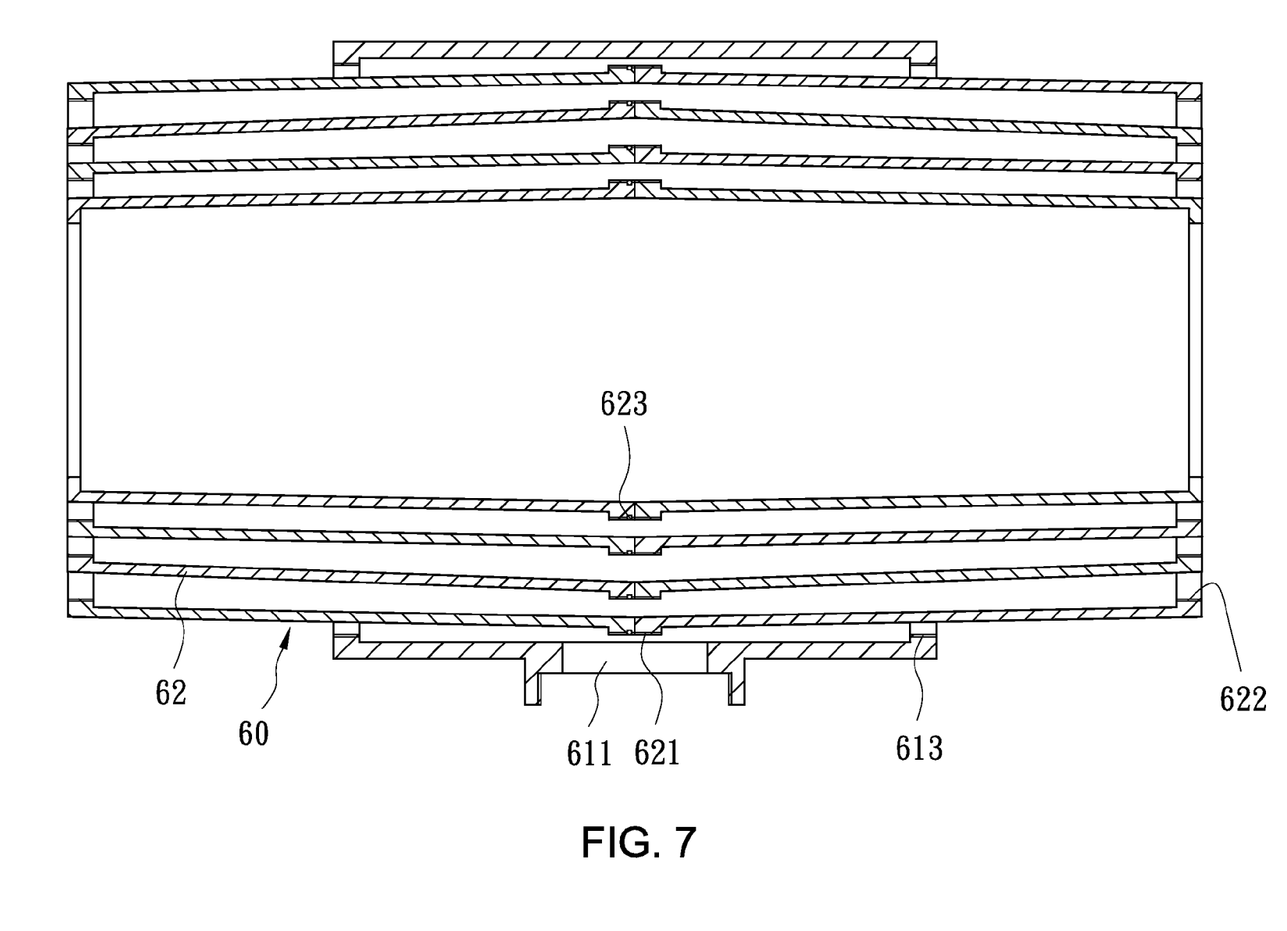
FIG. 7 is a cross sectional view of the water accumulating unit in a storage state thereof according to the second embodiment of the present invention.

Accordingly, the water accumulating unit 60 is in a stacked assembly prior to its use and is stored as a single sectioned pipe for convenient packaging and transportation. As shown in FIG. 7, during its usage, the two ends of the hollow sectioned pipe 62 is pulled outward such that the entire water accumulating unit 60 is extended to a suitable length, as shown in FIG. 8, which reduces its occupied space and is convenient for uses.

Therefore, by mounting the water accumulating unit 40 on the outer side of the connecting unit 30 and attaching the two ends thereof between the water controlling unit 10 and the water outgoing unit 20 as well as providing controls of the detecting unit 50 and the solenoid valve 13, the apparatus is able to immediately activate the solenoid 13 during the occurrence of water leakage and during a serious water leakage with the detection of a certain moisture level via the moisture sensor 512 to shut off the water outlet 12 and to stop water from going out such that the usage effect of immediate water shut-off is achieved. Furthermore, as the structure and configuration of various sanitary accessories can be different, user can choose a suitable bag or sectioned pipe of the water accumulating unit 40, 60 depending upon the needs such that it can be assembled with ease and can be adapted to various locations in the interior or exterior of the house.

In view of the above, the sanitary automatic water leakage detection and shut-off apparatus of the present invention is able to immediately control the solenoid 13 to close the water outlet 12 of the water controlling unit 10 once water leakage of the sanitary equipment is detected so as to immediately stop water supply to prevent the leakage. In addition, the water leaked out is completely enclosed by the water accumulated unit 40 such that the water does not flow out to the floor and lessens the worries of the damages to the interior decoration and furniture due to the water leakage.

What is claimed is:

1. A sanitary automatic water leakage detection and shut-off apparatus, installed between a water controlling unit and a water outgoing unit, having a connecting unit between the water controlling unit and the water outgoing unit, the water shut-off apparatus comprising:
   the water controlling unit including a water inlet, a water outlet and a solenoid valve between the water outlet and the water inlet; wherein the solenoid valve is a normally-open-type solenoid valve and is capable of closing the water outlet to stop water from going out;
   a water accumulating unit, provided between the water controlling unit and the water outgoing unit and completely enclosing the connecting unit, having a water accumulating hole adjacent to a bottom thereof; and
   a detecting unit, installed on the water accumulating hole of the water accumulating unit and electrically connected to the solenoid valve; wherein the detecting unit drives the solenoid valve in an electronic communication manner based on a leakage status of the water accumulating unit to shut off the water outlet of the water controlling unit and to stop water supply thereof.

2. The sanitary automatic water leakage detection and shut-off apparatus as claimed in claim 1, wherein the water accumulating unit includes a hollow room and two elastic restraining openings on two ends thereof, the water accumulating unit is mounted on an outer side of the connecting unit, and the two elastic restraining opening are mounted on the water outlet of the water controlling unit and the water outgoing unit respectively.

3. The sanitary automatic water leakage detection and shut-off apparatus as claimed in claim 1, wherein the detecting unit is electrically connected to the solenoid valve in a wireless communication manner.

4. The sanitary automatic water leakage detection and shut-off apparatus as claimed in claim 1, wherein the detecting unit includes a detection circuit, a container and a hollow securement ring; the detection circuit is received in the container, and the container and the securement ring are secured onto the water accumulating hole of the water accumulating unit with each other.

5. The sanitary automatic water leakage detection and shut-off apparatus as claimed in claim 4, wherein a top of the container of the detecting unit includes an external thread, and the securement ring includes an internal thread correspondingly fastened onto the external thread.

6. The sanitary automatic water leakage detection and shut-off apparatus as claimed in claim 4, wherein the detection circuit of the detecting unit includes a circuit board and a moisture sensor.

7. The sanitary automatic water leakage detection and shut-off apparatus as claimed in claim 4, wherein the detecting unit further includes an LED for emitting light so as to notify a leakage of the water detected thereby.

8. The sanitary automatic water leakage detection and shut-off apparatus as claimed in claim 6, wherein the detecting unit further includes a battery box and an alarming device for indicating a power status thereof; the battery box supplies a direct-current power to the detection circuit and provides a notification of insufficient power by the alarming device during a weak power thereof.

9. The sanitary automatic water leakage detection and shut-off apparatus as claimed in claim 1, wherein the water accumulating unit is a hollow plastic bag with two opening ends.

10. The sanitary automatic water leakage detection and shut-off apparatus as claimed in claim 1, wherein the water accumulating unit is formed of a plurality of elastic hollow sectioned pipes connected to each other.

\* \* \* \* \*